Figure 1:
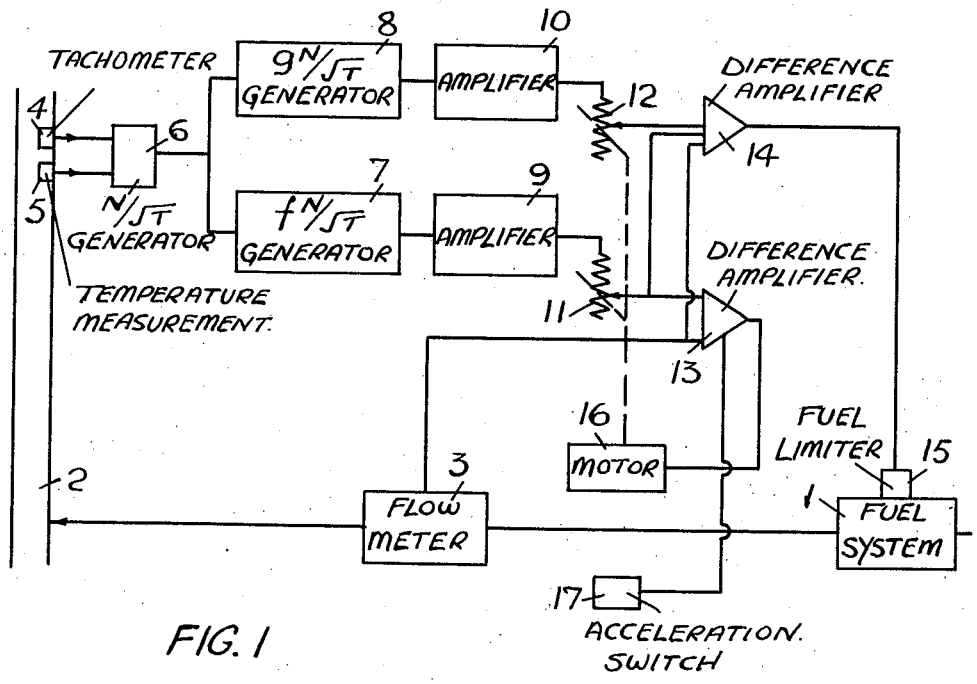

April 14, 1964   R. W. HAIGH   3,128,603
FUEL SUPPLY CONTROL FOR GAS TURBINE ENGINES
Filed May 18, 1961   2 Sheets-Sheet 1

April 14, 1964 R. W. HAIGH 3,128,603
FUEL SUPPLY CONTROL FOR GAS TURBINE ENGINES
Filed May 18, 1961 2 Sheets-Sheet 2
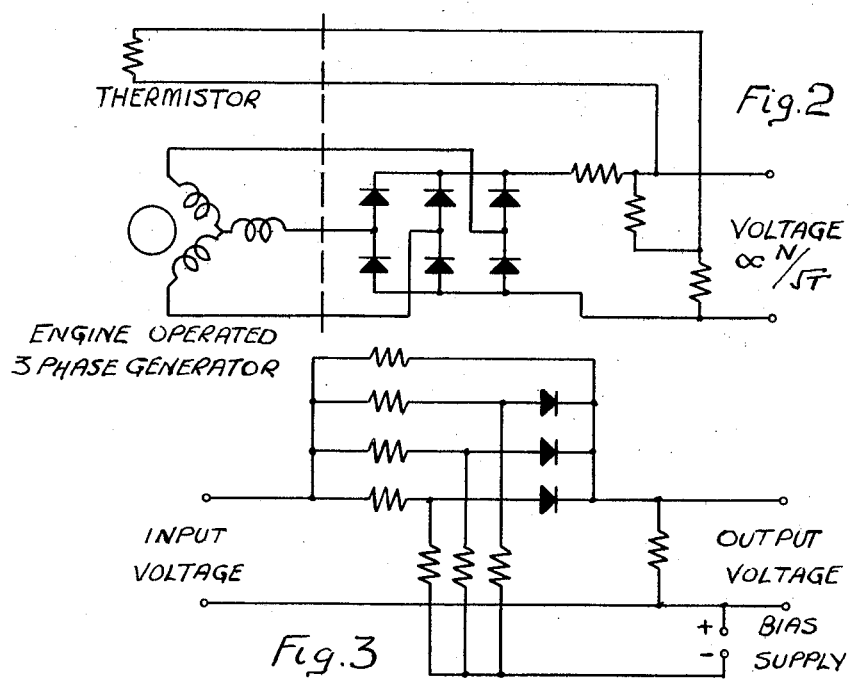
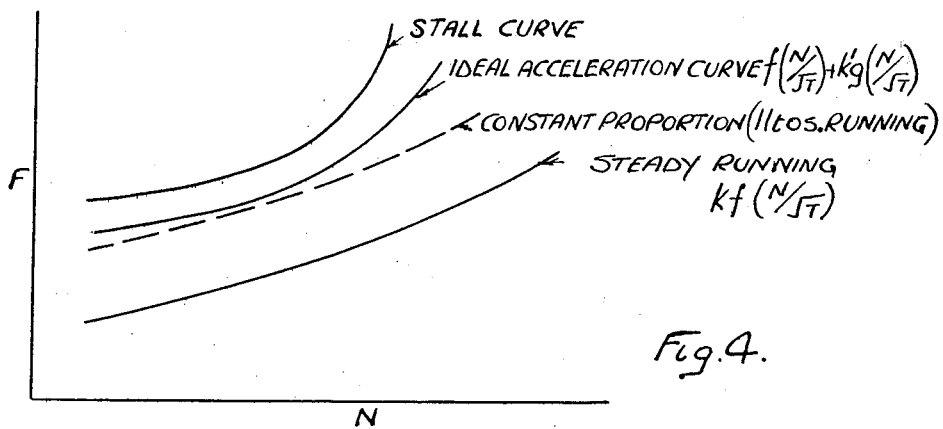

United States Patent Office 3,128,603
Patented Apr. 14, 1964

3,128,603
FUEL SUPPLY CONTROL FOR GAS TURBINE ENGINES
Richard Woolliscroft Haigh, Shelsley Beauchamp, England, assignor to Joseph Lucas (Industries) Limited, Birmingham, England
Filed May 18, 1961, Ser. No. 111,092
Claims priority, application Great Britain May 24, 1960
3 Claims. (Cl. 60—39.28)

The object of this invention is to provide in a convenient form a control for limiting the supply of fuel to the combustion chamber of a gas turbine engine in a manner to minimize risk of stalling of the engine during acceleration.

A control in accordance with the invention comprises in combination a flow meter for producing an electrical signal proportional to the rate of flow of fuel to the combustion chamber, means including a function generator for producing at any given speed an electrical signal proportional to the flow of fuel required for maintaining said given speed, and means responsive to said signals whereby at any instant during acceleration of the engine the flow of fuel in excess of the flow required for maintaining the speed of the engine at said instant constant will be limited to a proportion of the flow required for maintaining the speed at said instant, so that stalling of the engine as a result of over-rapid supply of fuel is prevented.

The aforesaid proportion may be constant, but alternatively it may vary with the speed of the engine.

In the accompanying drawings, FIG. 1 illustrates diagrammatically sufficient of one example for an understanding of the invention, FIGURES 2 and 3 illustrate two function generators used in FIG. 1, and FIG. 4 is a graph showing various curves referred to in the specification.

Referring to FIGURE 1, there is provided a fuel system 1 including a variable capacity pump for supplying fuel to the combustion chamber 2 of the engine, together with manually operable or automatic means for varying the fuel flow as required during steady running conditions. Between the pump and the combustion chamber is arranged a flow meter 3 for producing an electrical signal F proportional to the rate of flow of fuel to the combustion chamber.

Associated with the engine are a tachometer 4 and a temperature responsive means 5 for producing respectively electrical signals proportional to the speed of the engine, N, and the temperature T of the air entering the engine compressor. These signals are fed to a unit 6 which produces an output proportional to $$\frac{N}{\sqrt{T}}$$

The unit 6 is shown in FIG. 2, from which it will be seen that the N signal is obtained from an engine-driven alternator, and the $\sqrt{T}$ signal from a thermistor. The output from the unit 6 is fed to two function generators 7, 8. The generator 7 produces an output $$f\left(\frac{N}{\sqrt{T}}\right)$$

which is in the form of the steady running fuel flow curve of the engine, whilst the generator 8 produces an output $$g\left(\frac{N}{\sqrt{T}}\right)$$

which is dependent on the difference between the fuel required to attain the ideal acceleration curve and the fuel required to attain the steady running curve. A typical function generator is shown in FIG. 3, in which the diodes are biased on successively so that the output voltage follows a curve dependent on the function required. The outputs from the generators 7, 8 respectively are amplified by amplifiers 9, 10 and fed to the fixed members of a pair of potentiometers 11, 12.

There are further provided two amplifiers 13, 14 of the kind which produces an output only when the signals they receive are unequal. The amplifier 14 receives a signal F from the flow meter 3, and further signals from the potentiometers 11, 12, these signals being equal to $$Kf\left(\frac{N}{\sqrt{T}}\right) \text{ and } K'g\left(\frac{N}{\sqrt{T}}\right)$$

respectively where K, K' are the potentiometer factors, and being arranged to be of opposite polarity to the signal F. The output from the amplifier 14 is fed to means 15 which has an overriding control over the fuel supply to the combustion chamber and serves in a manner to be described to limit fuel flow during acceleration so as to prevent stalling of the engine. This means is operative only when the signal F exceeds the sum of the signals received by the amplifier 14 from the potentiometers. At other times the fuel flow is controlled by the fuel system 1.

The amplifier 13 receives the signal F and in addition the signal $$Kf\left(\frac{N}{\sqrt{T}}\right)$$

the output from the amplifier being used to operate a reversible electric motor 16 which drives the sliders of both potentiometers and thereby controls the values of the factors K, K'. Furthermore, any convenient switch means 17 is provided for preventing the amplifier 13 from producing an output when the engine is accelerating.

In operation, assuming that the engine is running steadily, the amplifier 13 receives signals $$Kf\left(\frac{N}{\sqrt{T}}\right)$$

If these are unequal the motor becomes operative to vary the positions of the pointers of both potentiometers until the signals $$F, Kf\left(\frac{N}{\sqrt{T}}\right)$$

are equal. The purpose of this is as follows. The curve $$Kf\left(\frac{N}{\sqrt{T}}\right)$$

represents the steady running curve of the engine on a graph of F against N as shown in FIG. 4. Whilst the shape of this curve does not vary, its position with respect to the F axis varies with changes in altitude and variations in the density and calorific value of the fuel. The potentiometer 11 serves during steady running to vary the factor K and thereby effectively maintain the curve $$Kf\left(\frac{N}{\sqrt{T}}\right)$$

at the correct position with respect to the F axis. Simultaneously, the potentiometer 12 corrects the over-fuelling curve $$g\left(\frac{N}{\sqrt{T}}\right)$$

The over-fuelling function is chosen to provide an ideal acceleration curve which as shown in FIG. 4 permits rapid acceleration without risk of stall. At this point the amplifier 14 receives a signal F of one polarity, and a signal $$Kf\left(\frac{N}{\sqrt{T}}\right)+K'g\left(\frac{N}{\sqrt{T}}\right)$$

of the opposite polarity, the latter signal representing the total amount of fuel required to attain the ideal acceleration curve at the particular speed at which the engine is running.

When the engine is accelerated the amplifier 13 is rendered inoperative by the means 17. As long as the acceleration is not too rapid the signal F does not exceed the signal $$Kf\left(\frac{N}{\sqrt{T}}\right)+K'g\left(\frac{N}{\sqrt{T}}\right)$$

but if F does exceed this value, the means 15 becomes effective. Hence the apparatus described will limit the rate of flow of fuel at any speed during acceleration to a proportion of that required to attain the ideal acceleration curve at that speed. Thus the engine will accelerate along a curve close to the ideal acceleration curve, provided that the attempted acceleration is sufficiently rapid to cause the control to become effective.

When the engine has stopped accelerating the amplifier 13 once more adjusts the positions of the potentiometer pointers to accord with any changes in altitude or fuel density. Thus, the operation can be summarised as follows.

Amplifier 14 compares actual fuel flow with the sum of a first signal representing steady state flow and a second signal representing the difference between ideal acceleration and steady state fuel flows in order to limit actual fuel flow. During steady state operation the effect of the second signal is corrected by amplifier 13, which compares actual flow and steady state flow to correct for environmental changes. However, during acceleration the correction is fixed due to the action of switch 17.

In the example described above the amount of fuel supplied to the engine at any given speed during acceleration is proportional to the fuel required to maintain said given speed. Further the constant of proportionality for any given speed of the engine is dependent on said given speed. It will be understood that, although the example described is preferable, the invention is of use where the proportion is independent of the speed in which case control is along the constant proportion curve shown in FIG. 4.

Having thus described my invention, what I claim as new and desire to secure by Letters Patent is:

1. An acceleration control for a gas turbine engine, comprising in combination a fuel system for supplying fuel to the engine, a flow meter for producing an electrical signal dependent on the rate of supply of fuel to the engine by the fuel system, function generating means for producing a voltage varying with engine speed in the manner of the steady running fuel flow curve of the engine, a potentiometer having a fixed resistor and a slider movable thereon, said voltage being applied across the fixed resistor, a first difference amplifier receiving a first input from the potentiometer slider and a second input from the flow meter, said difference amplifier producing an output when its inputs are not equal, a reversible motor operable by the output from said first difference amplifier, and operatively connected to the potentiometer slider so as to move the slider until the inputs to the first difference amplifier are equal, a second difference amplifier receiving a first input from the flow meter and a second input which is a proportion in excess of unity of the first input to the first difference amplifier, means associated with the fuel system and operable by the output from the second difference amplifier, said last-named means being effective to prevent further increase in flow of fuel to the engine when the first input to the second difference amplifier becomes equal to the second input thereto, and means for preventing operation of the motor whilst the engine is accelerating.

2. An acceleration control as claimed in claim 1 in which said proportion is fixed.

3. An acceleration control for a gas turbine engine, comprising in combination a fuel system for supplying fuel to the engine, a flow meter for producing an electrical signal dependent on the rate of supply of fuel to the engine by the fuel system, first function generating means for producing a first voltage varying with engine speed in the manner of the steady running fuel flow curve of the engine, second function generating means for producing a second voltage which varies with engine speed in a manner to represent the excess fuel over said steady state fuel which is required at any given speed to accelerate the engine rapidly without stalling, first and second potentiometers each including a fixed resistor and a slider movable thereon, the first and second voltages being applied across the resistors of first and second potentiometers respectively, a first difference amplifier receiving a first input from the slider of the first potentiometer and a second input from the flow meter, and producing an output when the inputs are unequal, a reversible motor operable by the output from the first difference amplifier and coupled to the sliders of both potentiometers for moving the sliders until the inputs to the first difference amplifier are equal, a second difference amplifier receiving a first input from the flow meter, a second input from the slider of the second potentiometer, and a third input from the slider of the first potentiometer, means associated with the fuel system and operable by the output from the second difference amplifier, said means being effective to prevent further increase in flow of fuel to the engine when the first input to the second difference amplifier becomes equal to the sum of the second and third inputs thereto, and means for preventing operation of the motor whilst the engine is accelerating.

References Cited in the file of this patent

UNITED STATES PATENTS

| | | |
|---|---|---|
| 2,851,855 | Gamble | Sept. 16, 1958 |
| 2,856,754 | Torell | Oct. 21, 1958 |